April 3, 1951 W. F. EICHER 2,547,523

ELECTRONIC PULSE GENERATOR

Filed Oct. 30, 1947 3 Sheets-Sheet 1

INVENTOR
W. F. EICHER
BY W. C. Parnell
ATTORNEY

April 3, 1951 W. F. EICHER 2,547,523

ELECTRONIC PULSE GENERATOR

Filed Oct. 30, 1947 3 Sheets-Sheet 2

INVENTOR
W. F. EICHER
BY W. C. Parnell
ATTORNEY

April 3, 1951 W. F. EICHER 2,547,523

ELECTRONIC PULSE GENERATOR

Filed Oct. 30, 1947 3 Sheets-Sheet 3

INVENTOR
W. F. EICHER
BY W. C. Parnell
ATTORNEY

Patented Apr. 3, 1951

2,547,523

UNITED STATES PATENT OFFICE 2,547,523

ELECTRONIC PULSE GENERATOR

William F. Eicher, Westfield, N. J., assignor to Western Electric Company, Incorporated, New York, N. Y., a corporation of New York Application October 30, 1947, Serial No. 783,127

2 Claims. (Cl. 250—36)

This invention relates to methods of and apparatus for generating pulses and particularly to electronic methods and apparatus for generating electric pulses of the types suitable for therapeutic purposes.

In the treatment of impaired nerves, for example, by means of electric current, it has been found desirable to employ electric pulses of essentially square wave form. These pulses should be of adjustable amplitude, duration, and frequency, and should occur in groups or bursts, each of which is followed by a suitable no-signal or rest interval which may or may not be of the same duration as a burst.

For producing such pulses it has been proposed heretofore to use electro-dynamic apparatus such as a special adjustable speed commutator device with a plurality of brushes which may be shifted or selectively connected to the electrodes to give the type of pulses required.

It is the object of this invention to generate these pulses without the use of rotating machinery but rather by means of electronic apparatus which is compact, electrically stable, and readily operable to give a wide selection of pulse characteristics.

According to the general features of the invention, there is first produced a keying wave of pulses having a frequency, pulse duration and pulse spacing corresponding to the desired burst rate, length of burst and rest period between bursts, respectively. These primary waves then are used to control the generation of secondary pulses of any desired frequency, within the interval defined by the controlling primary wave. Each secondary pulse in turn controls the generation of a final square pulse which is adjustable to any desired proportion of the duration of the secondary pulse. These final pulses then may be amplified to the magnitude required in each case.

Figure 1:
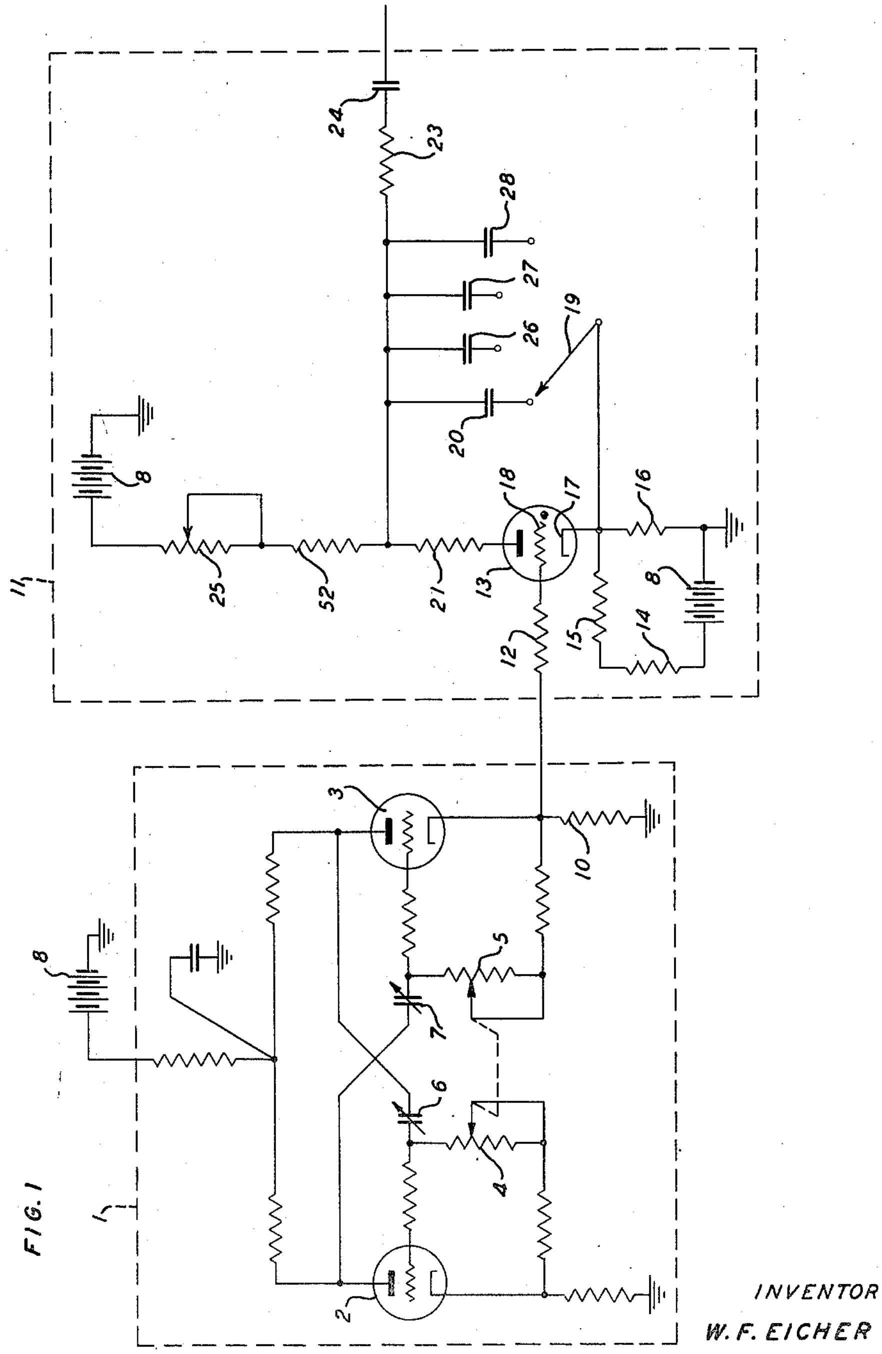
Figure 2:
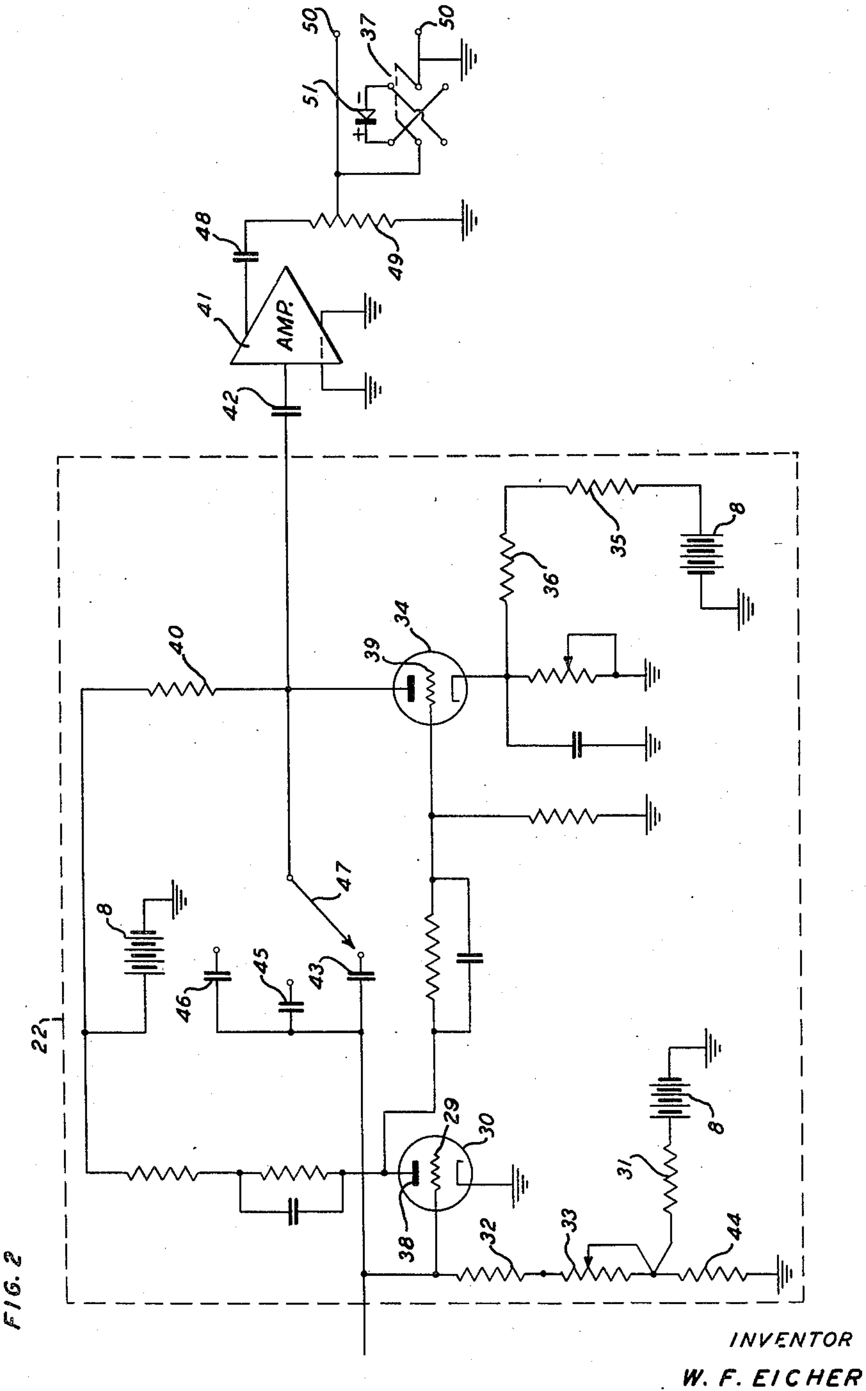

The manner in which these pulses may be produced will be best understood by reference to the following detailed description and the drawings in which Figs. 1 and 2 taken together are a schematic diagram of one form of electronic apparatus according to the invention, and Figs. 3 to 9 are curves showing the variations in potential of the signal at various points in the apparatus during a complete cycle of its operation.

In the drawing the square wave generator 1 comprises two vacuum tubes 2 and 3, connected as a free-running multivibrator in which the time constants of the grid circuits may be varied simultaneously by varying the effective resistances of the grid leaks 4 and 5 to vary the frequency of the oscillations. This is accomplished by ganging the controls of the resistors as indicated so that as the effective resistance of the grid leaks is reduced, the discharge times of condensers 6 and 7 are reduced and the frequency of the oscillations is increased. The tubes are energized from a source 8, shown as a battery, but in practice it ordinarily would be a conventional power supply unit operating from commercial supply lines and serving as the source of direct current wherever a battery is indicated in the other parts of the apparatus to be described.

The substantially square output potential wave 9 (Fig. 3) developed across resistor 10 in the cathode return circuit of tube 3, when the tube is conducting, is applied to the relaxation oscillator 11 through a high resistor 12 which limits the grid current of the oscillator when it is operating, as described below. In the circuit shown, the oscillator is a gas-filled tube 13 biased by bleeder current from the source 8 through resistors 14 and 15 and the cathode resistor 16. In the absence of signal from the multivibrator 1, the potential drop in resistor 16 maintains the cathode 17 so highly positive with respect to the grid 18 that the tube is non-conducting. Under this condition and with the switch 19 connected to condenser 20, as shown, the condenser is charged by current from the source 8.

Figure 3:
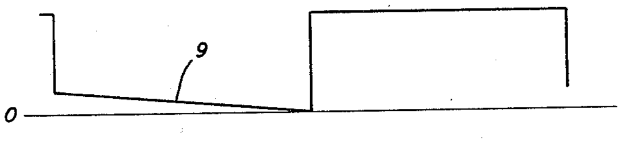

When tube 3 of the multivibrator is conducting, the potential of the positive pulse curve 9 applied to the grid 18 fires the tube 13 and establishes a low impedance discharge path for the condenser 20 through a current limiting resistor 21 and the low flashed impedance of tube 13. With tube 13 in a conducting condition, the current from source 8 through resistors 25, 52, and 21, tube 13 and cathode resistor 16 lowers the plate potential as indicated, for example, by line 53 of curve 54 (Fig. 4), which shows the plate potential variations over a complete multivibrator cycle. At this lower plate potential, the flashed condition of tube 13 cannot be sustained even with grid 18 at the potential of the positive pulse of curve 9 (Fig. 3). The tube 13 therefore is reset and the condenser 20 is recharged by current from the source 8 through high resistors 25 and 52, condenser 20, and cathode resistor 16. As the recharging of the condenser 20 progresses, the plate potential rises along line 55 until at point 56 the tube again fires due to the positive potential still present on the grid 18. Upon the firing of the tube its plate potential is again reduced along the line 57 to complete the saw tooth wave.

Figure 5:
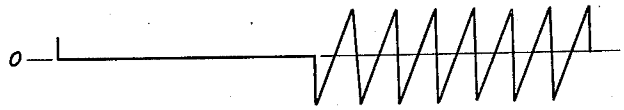

The oscillator 11 is coupled to a start-stop multivibrator 22 through the usual blocking condenser 24 and a resistor 23 which presents a high impedance to the condenser discharge current. It therefore will be understood that as long as the tube 3 is conducting, the oscillator 11 will transmit saw tooth pulses to the multivibrator 22 at a frequency determined by the capacity of the condenser 20 and the variable resistor 25 in the condenser charging circuit, as shown in Fig. 5. Adjustment of the resistor 25 varies the oscillator frequency over a limited band and by providing suitable additional condensers, such as 26, 27, and 28, which may be selectively substituted for condenser 20, any desired number of saw tooth pulses can be obtained during each positive pulse of the multivibrator 1.

Figure 4:
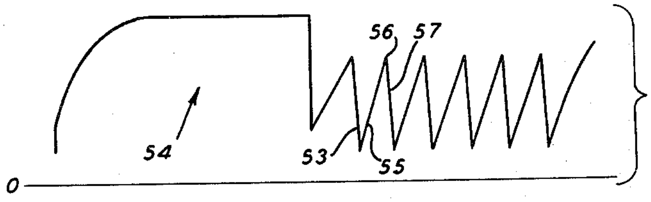

In the multivibrator 22 the grid 29 of the tube 30 is positively biased by potential from the source 8 applied thereto to resistors 31, 32 and variable resistor 33. The tube 30 therefore is normally conducting, but the tube 34 is biased beyond cut-off by positive potential applied to the cathode through resistors 35 and 36. As the potential variations of Fig. 4 are impressed on the multivibrator 22 through a condenser 24, the effective potentials applied to grid 29 when the multivibrator is not operating are symmetrical with respect to ground, as indicated by the curve at Fig. 5. When the multivibrator 22 is operating, however, the grid condensers discharge through the grid resistors of tube 30, as explained below, and due to the resulting potential drop in these resistors, the potential of grid 29 actually varies in accordance with the curve of Fig. 6.

Figure 6:
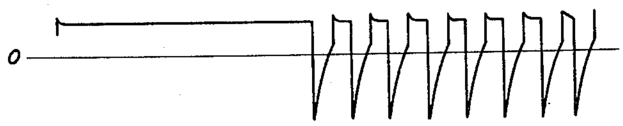
Figure 7:
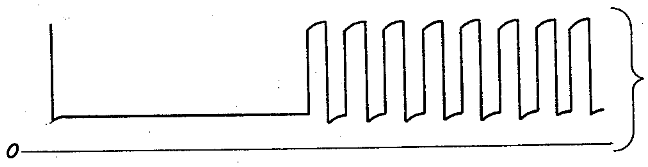
Figure 8:
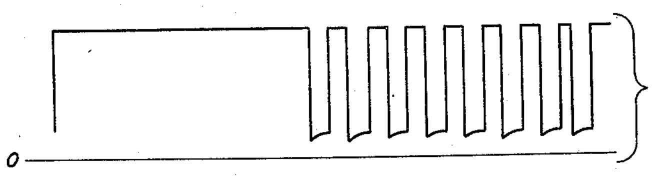
Figure 9:
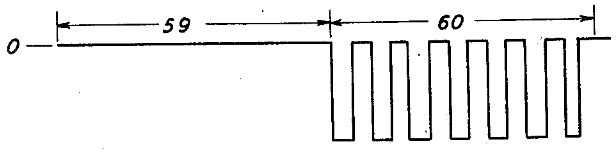

Each negative pulse of the curve of Fig. 6 drives the grid 29 in a negative direction to block the tube momentarily, and the resulting rise (Fig. 7) in potential of the plate 38 in each instance raises the potential of the grid 39 of tube 34 and unblocks this tube. The plate current of tube 34 causes a potential drop in the resistor 40 thereby transmitting a negative pulse as shown in Fig. 8 to the amplifier 41 through the coupling condenser 42 and to the grid 29 of tube 30 through a condenser 43. As this latter condenser discharges to ground through resistors 32, 33, and 44, however, the potential of grid 29 rises again due to its connection through resistor 31 to the source 8, and when the cut-off potential is passed, tube 30 begins to conduct again. When this occurs, the plate potential of this tube is reduced, thereby reducing the potential of grid 39 of tube 34 below the cut-off point and the normal stable condition, with tube 30 conducting and tube 34 cut off, has been re-established and will be maintained until grid 29 receives another negative pulse from the oscillator 11. At the time tube 34 is cut off, its plate voltage rises suddenly, transmitting to the amplifier 41 a positive pulse which is terminated by the next pulse due to tube 34 becoming conductive again in response to a pulse at grid 29 from the oscillator 11, as already described.

The output potential of tube 34, as shown in Fig. 8, therefore comprises a series of negative, square wave pulses formed as the potential falls suddenly from its normal value at cut-off to a minimum when tube 34 is unblocked by the potential of Fig. 7 and suddenly rises again to normal when the tube is blocked. These potential variations, transmitted through condenser 42, are impressed on amplifier 41 as bursts of square waves, symmetrical with respect to ground, each wave being produced singly by the individual saw-tooth waves of the oscillator 11. It should be noted, however, that the duration of these individual waves is controlled by the discharge time of the condenser 43. This time may be adjusted over a limited range by adjusting resistor 33 in the discharge path, and major changes in discharge time may be obtained by selectively connecting into the circuit other condensers of different capacities, such as 45 and 46, by means of switch 47.

In this manner it is possible to obtain square waves having pulses ranging in duration from very short to comparatively long. The length of the negative pulse corresponds to the time tube 34, remains conducting, and is not limited necessarily to the period of the oscillator 11, for if a second negative pulse from the oscillator appears at grid 29 while its potential is still far below cut-off, due to condenser discharge current, the pulse will be ineffective to unblock the tube 30. In this event, grid 39 of tube 34 remains at high positive potential and the tube continues in conducting condition, prolonging the negative pulse until the third negative pulse is received at grid 29 from oscillator 11. It therefore will be understood that by proper choice of circuit constants, the relative durations of the positive and negative pulses supplied to the amplifier 41 may be varied as desired.

The amplifier may be of any suitable type capable of delivering at its output the desired square waves without excessive distortion. These output waves preferably are impressed through a blocking condenser 48 on a potentiometer 49 for regulating their amplitude at the output terminals 50. The square wave potentials impressed on the potentiometer will consist of pulses alternately positive and negative with respect to ground, but if pulses of only one polarity are required, those of the other polarity may be suppressed, as for example, by a diode 51. When the reversing switch 37 is open, both pulses are transmitted to the terminals, but by closing the switch upwardly or downwardly, only pulses of either desired polarity are obtained. When, for example, the switch is closed upwardly, the positive pulses are shunted by the diode and produce no potential difference between the terminals so that the resulting output consists only of negative pulses, such as 58 in Fig. 9.

When the circuit is designed as mentioned above to give positive and negative pulses of different durations, the longer pulses at terminals 50 may be either negative or positive as desired by using either an odd or an even number of stages, respectively, in the amplifier 41.

The curves of Figs. 3 to 9, showing the shape of the signal in various parts of the circuit during one cycle of the multivibrator 1, are of course merely illustrative and are shown for the condition in which the pulses generated by the two tubes are equal. The relative durations of the pulses may be varied over a wide range in accordance with the choice of the time constants of the grid circuits of tubes 2 and 3 in the multivibrator, thereby making it possible to obtain different ratios of rest period 59 to pulse burst time 60 in the final signal of Fig. 9. For clarity of illustration, the relaxation oscillator 11 is shown in Fig. 4 as generating only a few saw tooth waves during each positive half-cycle of the multivibrator 1, but in practice the oscillator frequency, and hence the repetition rate of the final pulses in a burst, may vary from a very few to a great many for each cycle of the multivibrator.

In one generator according to the invention, adjustment of the grid leaks 4 and 5 varies the frequency of the multivibrator 1 from 10 to 200 cycles per minute to give the desired range of variation in the burst rate. In the oscillator 11, the condensers 20, 26, 27, and 28 have such capacities as to give frequencies differing from each other by an interval less than the range of frequency adjustment obtainable by varying the charging rate by means of resistor 25. Hence, by selecting different condensers with the switch 19 and adjusting the resistor 25, the oscillator frequency was continuously variable from about 25 to more than 500 cycles per second to give a wide range of repetition rate of the final pulses in each burst.

In the multivibrator 22 condensers 43, 45, and 47 have such capacities as to give frequencies differing from each other by an interval less than the range of frequency adjustment obtainable by varying the charging rate by means of resistor 33. Hence, by selecting different condensers with the switch 47 and adjusting the resistor 33, the pulse duration was continuously variable from about 100 microseconds to more than 10,000 microseconds to give a wide range of pulse duration of the final pulses in each burst.

From the foregoing description, it will be seen that applicant has provided a source of discrete bursts of square wave pulses which may be varied in amplitude, polarity, duration, repetition rate, and time spacing between the successive bursts, or which may be of alternating polarities with the positive and negative pulses of the same or different durations as the case requires.

While the invention has been described for purposes of illustration with reference to an embodiment adapted particularly to therapeutic uses, it will be understood that it is equally applicable to other purposes for which variable pulses are required. From the foregoing description it also will be apparent to those skilled in the art that, within the spirit and scope of the invention, many modifications may be made in the circuit shown, as desired, or as necessary to adapt the principles of the invention to the requirements of a particular case.

What is claimed is:

1. An electronic pulse generator comprising a free-running multivibrator, a relaxation oscillator normally biased to cut-off but intermittently operated by the output of the multivibrator, a start-stop multivibrator actuated by each wave of the oscillator to produce square wave pulses therefrom, means for adjusting the duration of the square wave pulses and an output circuit including pulse polarity selecting means connected to the start-stop multivibrator.

2. Electronic apparatus comprising a variable frequency, free-running multivibrator, a relaxation oscillator normally biased to cut-off, and having a plurality of tuning condensers and means for selecting any one of the condensers to determine the oscillator frequency, a connection between the multivibrator and the oscillator for intermittently operating the oscillator, a pulse generating multivibrator having a connection to the oscillator for causing the oscilator to initiate the operating cycle of the pulse generating multivibrator, and adjustable means for varying the duration of the individual pulses generated.

WILLIAM F. EICHER.

REFERENCES CITED

The following references are of record in the file of this patent:

UNITED STATES PATENTS

| Number | Name | Date |
|---|---|---|
| 2,284,444 | Peterson | May 26, 1942 |
| 2,409,577 | Matson, Jr. | Oct. 15, 1946 |
| 2,434,669 | Meacham | Jan. 20, 1948 |
| 2,443,922 | Moore | June 22, 1948 |